United States Patent
Rouleau (10) Patent No.: US 9,293,899 B2
(45) Date of Patent: Mar. 22, 2016

(54) TRANSITION SPLICE FOR CABLE ROUTING SYSTEM

(71) Applicant: Panduit Corp., Tinley Park, IL (US)

(72) Inventor: Rodney G. Rouleau, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 416 days.

(21) Appl. No.: 13/765,261

(22) Filed: Feb. 12, 2013

(65) Prior Publication Data

US 2014/0224515 A1    Aug. 14, 2014

(51) Int. Cl.
| | |
|---|---|
| *H02G 7/05* | (2006.01) |
| *H02G 3/04* | (2006.01) |
| *H02G 3/06* | (2006.01) |
| *E04B 5/48* | (2006.01) |

(52) U.S. Cl.
CPC ........... *H02G 3/0608* (2013.01); *H02G 3/0443* (2013.01); *Y10T 29/49826* (2015.01); *Y10T 29/49963* (2015.01)

(58) Field of Classification Search
USPC .............................................. 248/49; 174/43
See application file for complete search history.

(56) References Cited

U.S. PATENT DOCUMENTS

| | | | |
|---|---|---|---|
| 3,448,955 | A | 6/1969 | Fussell |
| 5,384,937 | A | 1/1995 | Simon |
| 6,061,884 | A | 5/2000 | Ohms et al. |
| 6,193,434 | B1 | 2/2001 | Durin et al. |
| 6,247,871 | B1 | 6/2001 | Nickel et al. |
| 6,402,418 | B1 | 6/2002 | Durin et al. |
| 6,498,296 | B2 | 12/2002 | Benito-Navazo |
| 6,590,154 | B1* | 7/2003 | Badey et al. ............. 174/480 |
| 6,643,900 | B2 | 11/2003 | Jährling |
| 7,373,759 | B1* | 5/2008 | Simmons ................. 52/220.5 |
| 7,452,157 | B2 | 11/2008 | Deciry |
| 7,462,785 | B1 | 12/2008 | Davis et al. |
| 7,544,895 | B2 | 6/2009 | Penichon |
| 7,546,987 | B2 | 6/2009 | Sinkoff |
| 7,608,786 | B2 | 10/2009 | Deciry et al. |
| 7,903,924 | B2 | 3/2011 | Pollard, Jr. et al. |
| 7,954,776 | B2* | 6/2011 | Davis et al. ............ 248/231.81 |
| 7,959,019 | B2 | 6/2011 | Jette |
| 8,684,319 | B2* | 4/2014 | Brouwer et al. ............. 248/49 |
| 2003/0108385 | A1 | 6/2003 | Finco et al. |
| 2003/0156892 | A1 | 8/2003 | Finco et al. |
| 2005/0040295 | A1* | 2/2005 | Sinkoff ....................... 248/58 |

(Continued)

FOREIGN PATENT DOCUMENTS

| | | |
|---|---|---|
| DE | 2036325 A1 | 1/1972 |
| EP | 1195870 A1 | 3/2003 |
| EP | 0905843 B1 | 2/2005 |

(Continued)

*Primary Examiner* — Timothy Thompson
*Assistant Examiner* — Michael F McAllister
(74) *Attorney, Agent, or Firm* — Christopher S. Clancy; Aimee E. McVady (57) ABSTRACT

The present invention is directed toward a transition splice that joins a cable tray and cable basket to form a cable routing system. The cable tray and cable basket each include a plurality of longitudinal wires and a plurality of transverse wires. An end transverse wire of the cable basket is positioned adjacent to an end transverse wire of the cable tray. A plurality of the longitudinal wires of the cable tray and the cable basket are aligned to form a pathway. The transition splice is secured to an end of the cable tray and to an end of the cable basket to maintain the pathway for routing cables thereon.

10 Claims, 7 Drawing Sheets

(56) References Cited

U.S. PATENT DOCUMENTS

2005/0063775 A1    3/2005    Boltz
2008/0066401 A1*   3/2008    Jette .............................. 52/220.1
2010/0320334 A1   12/2010   Crain et al.

FOREIGN PATENT DOCUMENTS

| | | |
|---|---|---|
| EP | 1727252 A1 | 11/2006 |
| EP | 1793464 A1 | 6/2007 |
| WO | 2005090845 A1 | 9/2005 |

* cited by examiner

TRANSITION SPLICE FOR CABLE ROUTING SYSTEM

FIELD OF THE INVENTION

The present invention relates to a splice for a cable routing system, and more particularly to a splice for transitioning a cable tray to a cable basket in a cable routing system.

BACKGROUND OF THE INVENTION

Overhead cable routing systems typically include a cable basket or a cable duct. The cable basket includes integral side walls. Various routing devices are installed on the cable basket during installation. One of these devices is a side wall joiner that is installed at the ends of cable baskets to join the side wall of one cable basket with the side wall of a second cable basket.

Applicant invented a new cable routing system that has been described in Applicant's U.S. Patent Pub. Nos. 2011/0284283; 2011/0284701; 2011/0284702; and 2011/0286785. The cable tray described in the pending patent applications includes longitudinal wires and transverse wires with downwardly extending sidewalls. Various devices, such as a side wall joiner, are installed on the cable trays in the cable routing system. The side wall joiner is installed at an end of a first cable tray and an end of a second cable tray to join the cable trays and to maintain the cable routing system.

A cable routing system may also include a combination of cable trays and cable baskets. The prior art side wall joiners, however, are not designed to connect the end of a cable tray to the end of a cable basket. As such, it is desirable to provide a transition splice that joins the end of a cable tray to the end of a cable basket to maintain a pathway for routing cables.

SUMMARY OF THE INVENTION

The present invention is directed to a cable routing system including a cable tray and a cable basket. The cable tray and the cable basket each have a plurality of longitudinal wires and a plurality of transverse wires. One end of the cable basket is positioned adjacent to one end of the cable tray such that a plurality of the longitudinal wires align to create a cable pathway. A transition splice is positioned on each side of the cable pathway to secure the end of the cable tray to the end of the cable basket. The transition splice maintains the cable pathway to route cables thereon.

DETAILED DESCRIPTION

Figure 1:
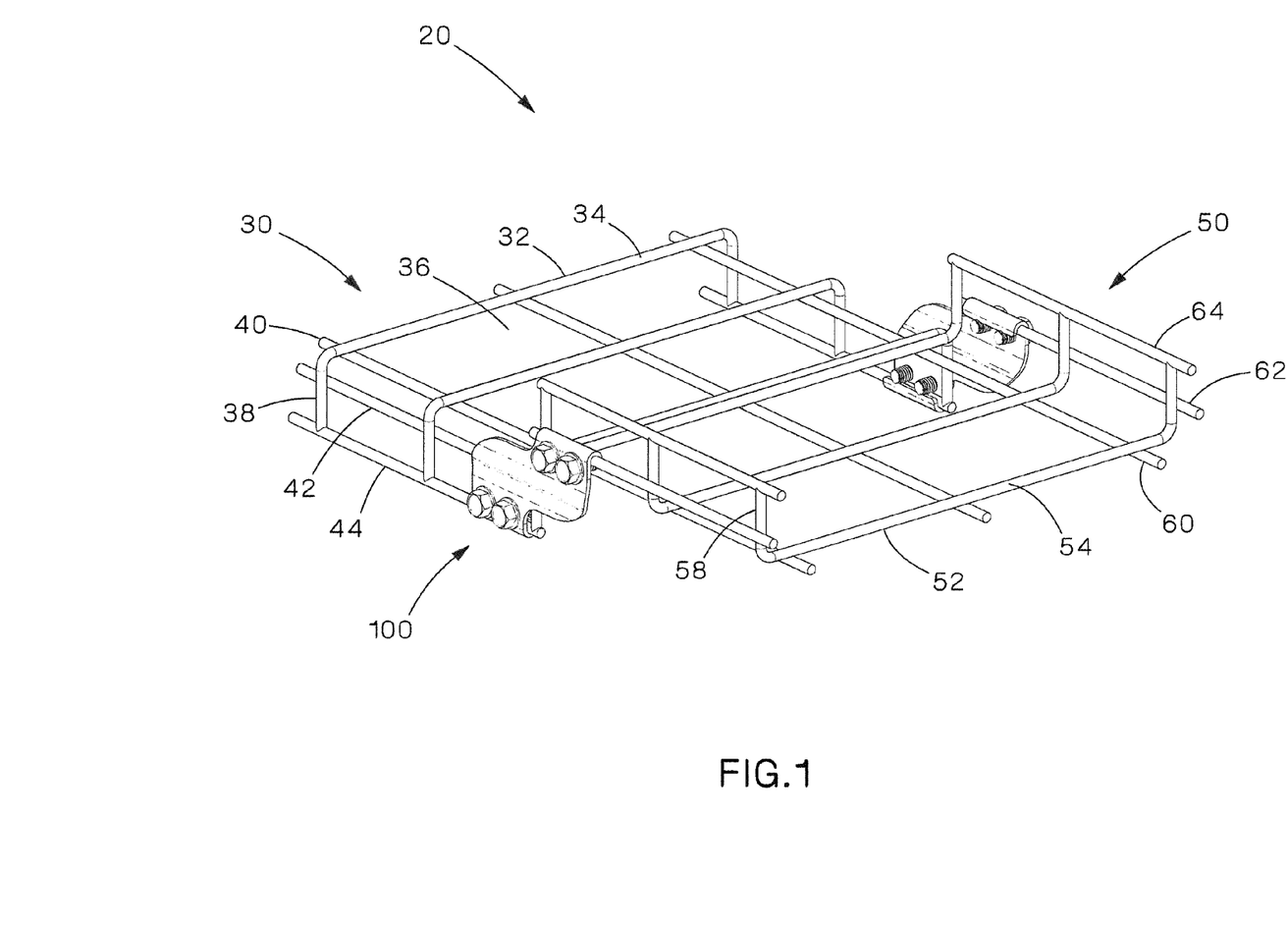
FIG. 1 is a perspective view of a transition splice of the present invention installed on each side of a cable routing system.
Figure 1A:
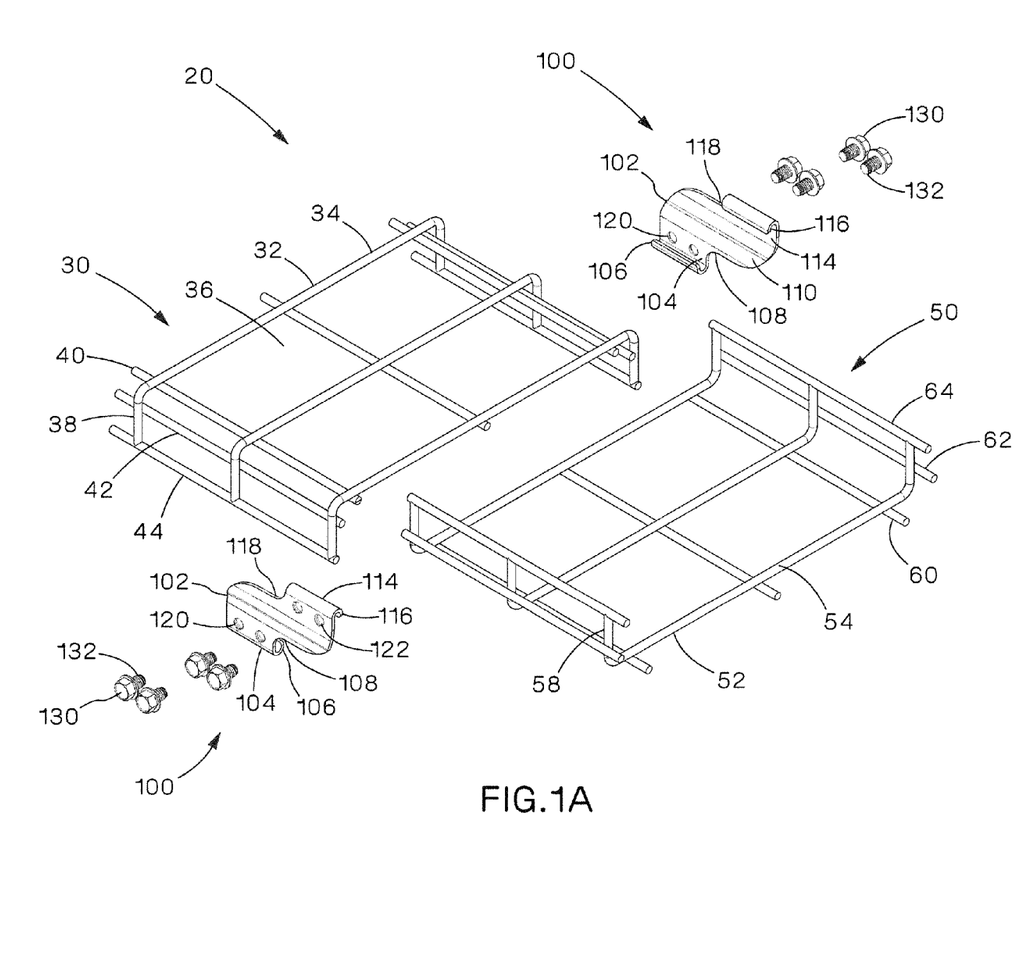
FIG. 1A is an exploded view of each transition splice and the cable routing system of FIG. 1.

FIG. 1 illustrates two transition splices 100 of the present invention connected to a cable tray 30 and a cable basket 50 in a cable routing system 20. As discussed above, the cable tray 30 is described in Applicant's U.S. Patent Pub. Nos. 2011/0284283; 2011/0284701; 2011/0284702; and 2011/0286785 herein incorporated by reference. As illustrated in FIGS. 1 and 1A, the cable tray 30 includes a plurality of transverse wires 32 and a plurality of longitudinal wires 40. The transverse wires 32 include a top portion 34 and downwardly extending side walls 38. The top portion 34 forms a generally flat top 36 for supporting cables routed thereon. Longitudinal wires 40 are positioned underneath the top portion 34 of the transverse wires 32. A side longitudinal wire 42 is positioned adjacent to the inner side of each side wall 38 and a bottom longitudinal wire 44 is positioned at the bottom of each side wall 38.

FIGS. 1 and 1A further illustrate the cable basket 50 with a plurality of transverse wires 52 and a plurality of longitudinal wires 60. The transverse wires 52 include a bottom portion 54 and upwardly extending side walls 58. Longitudinal wires 60 are positioned underneath the bottom portion 54 of the transverse wires 52. A side longitudinal wire 62 is positioned adjacent the outer side of each side wall 58 and a top longitudinal wire 64 is positioned at the top of each side wall 58.

The cable tray 30 and the cable basket 50 are aligned such that the top portion 34 formed by the transverse wires 32 of the cable tray 30 aligns with the bottom portion 54 of the transverse wires 52 of the cable basket 50. The top portion 34 of an end of transverse wire 32 is positioned adjacent to the bottom portion 54 of an end transverse wire 52. Thus, the longitudinal wires 40 of the cable tray 30 and the longitudinal wires 60 of the cable basket 50 align. As illustrated in FIG. 1, the transition splices 100 adjoining cable tray 30 and cable basket 50 maintain a flat plane or pathway to route cables thereon.

Figure 2:
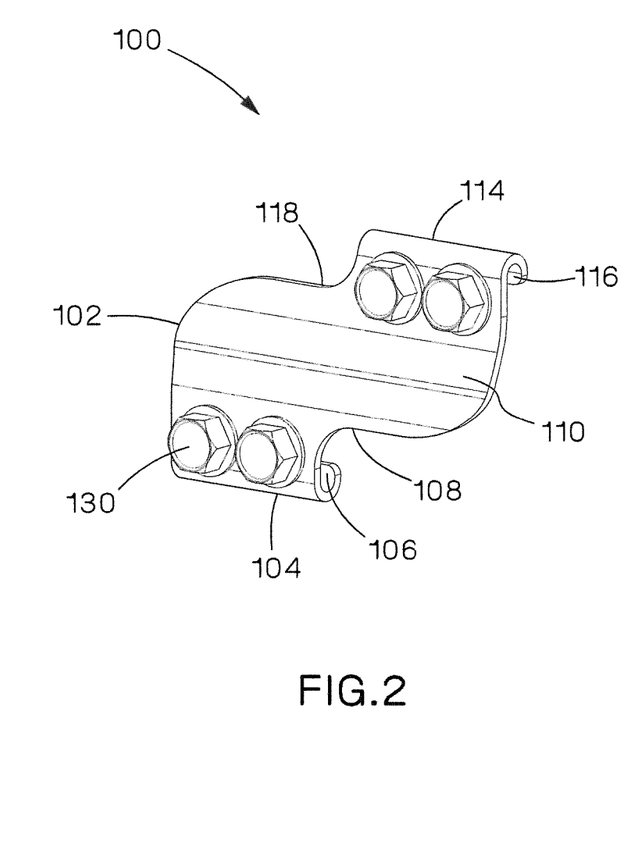
FIG. 2 is a front perspective view of a transition splice of FIG. 1.
Figure 3:
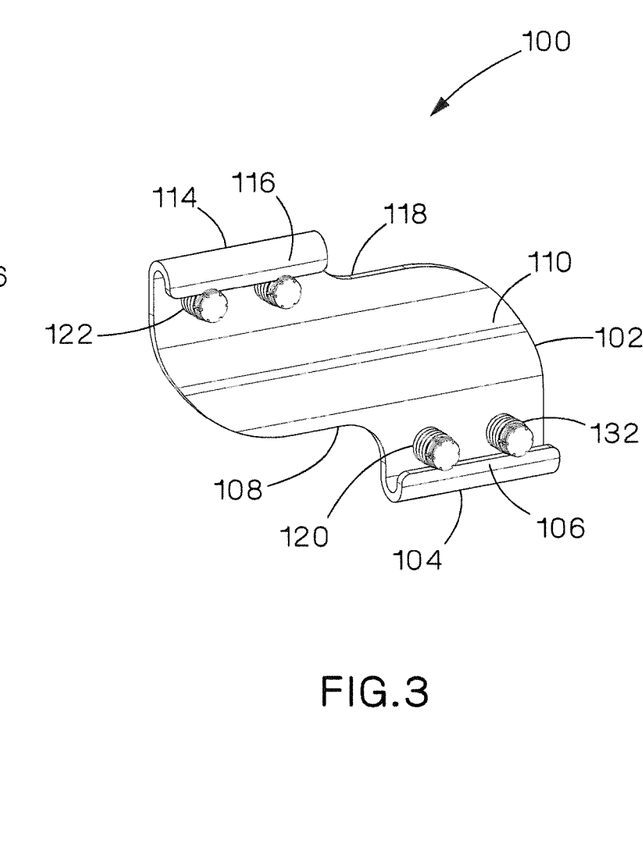
FIG. 3 is a rear perspective view of a transition splice of FIG. 1.

As illustrated in FIGS. 1A, 2, and 3, the transition splice 100 includes a body 102 with a bottom portion 104, a bottom edge 108, a center portion 110, a top portion 114, and a top edge 118. Opposing hook members extend from the bottom portion 104 and the top portion 114 of the body 102. Thus, an upwardly extending hook 106 extends from the bottom portion 104 of the body 102 and a downwardly extending hook 116 extends from the top portion 114 of the body 102. The bottom portion 104 and the top portion 114 also each include holes 120, 122, respectively, for receiving bolts 130 to secure the transition splice 100 to the cable tray 30 and the cable basket 50.

Figure 4:
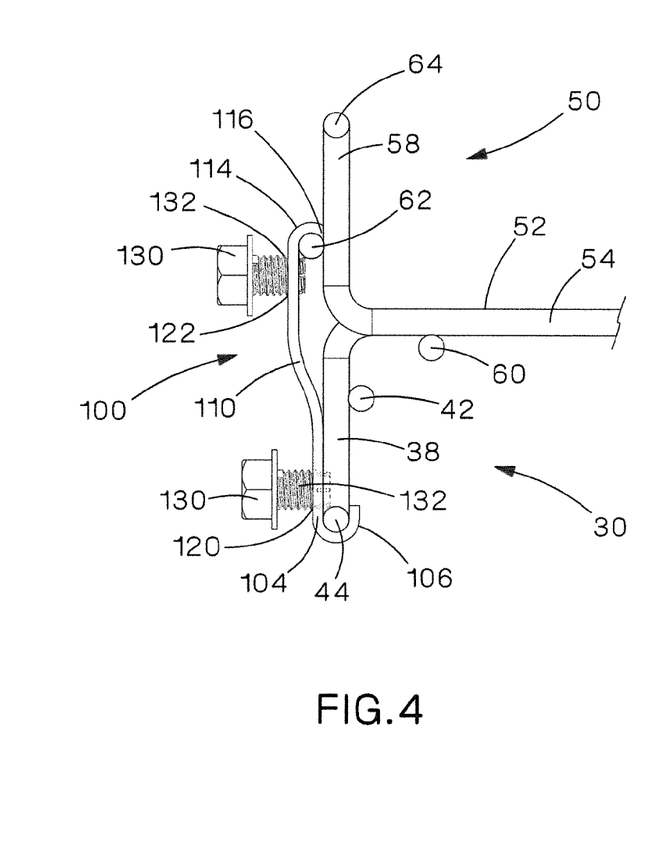
FIG. 4 is a partial side view of a transition splice and the cable routing system of FIG. 1 before the bolts are installed.
Figure 5:
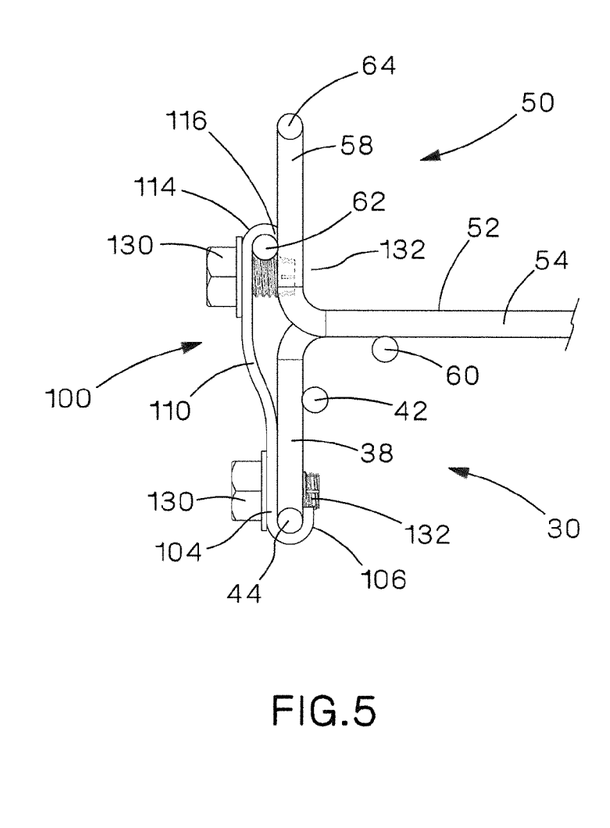
FIG. 5 is a partial side view of a transition splice and the cable routing system of FIG. 4 with the bolts installed.
Figure 6:
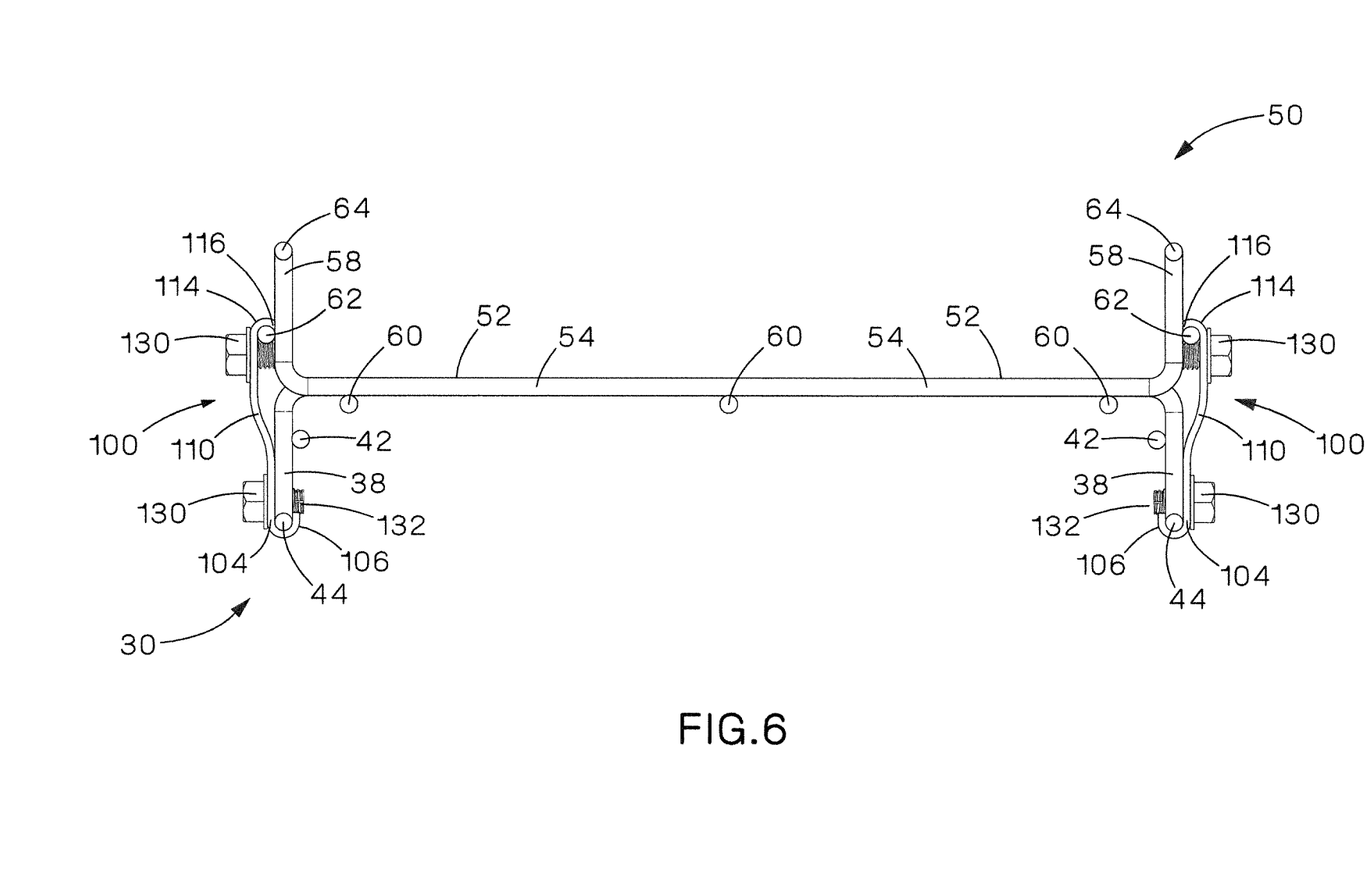
FIG. 6 is a side view of each transition splice and cable routing system of FIG. 1.

FIG. 4 illustrates a side view of a transition splice 100 partially installed on the cable tray 30 and the cable basket 50. The transition splice 100 is installed on the cable tray 30 and the cable basket 50 with the bonding bolts 130. As illustrated in FIG. 4, the hook 106 at the bottom portion 104 of the transition splice 100 is positioned around the bottom longitudinal wire 44 of the cable tray 30 and the hook 116 at the top portion 114 of the transition splice 100 is positioned around the side longitudinal wire 62 of the cable basket 50. Once the transition splice 100 is installed, the bolts 130 are tightened. As the bolts 130 are tightened, the transition splice 100 compresses the longitudinal wires 44, 62 against the hooks 106, 116, respectively. A force is applied to the interior surface of the longitudinal wires 44, 62 piercing the coating of the wires thereby creating a bond between the cable tray 30 and the cable basket 50. FIGS. 5 and 6 illustrate the interference fit of the transition splice 100 against the longitudinal wires 44, 62 of the cable tray 30 and cable basket 50, respectively.

The interference fit allows the bolt threads 132 to create a strong bond between the transition splice 100 and the longitudinal wires 44, 62 of the cable tray 30 and the cable basket 50, respectively. The interference fit of the bolts 130 also locks the hooks 106, 116 of the transition splice 100 firmly against the cable tray 30 and cable basket 50 to create a strong mechanical connection. Two bolts 130 are used to prevent rotation that could occur with a single bolt design. However, if necessary, a single bolt may be used. The second bolt acts as a redundant bond between the transition splice 100 and the wires of the cable tray 30 and cable basket 50.

The transition splice of the present invention joins two different cable routing systems to create a single cable routing system while maintaining a flat cable pathway for routing cables thereon.

Figure 7:
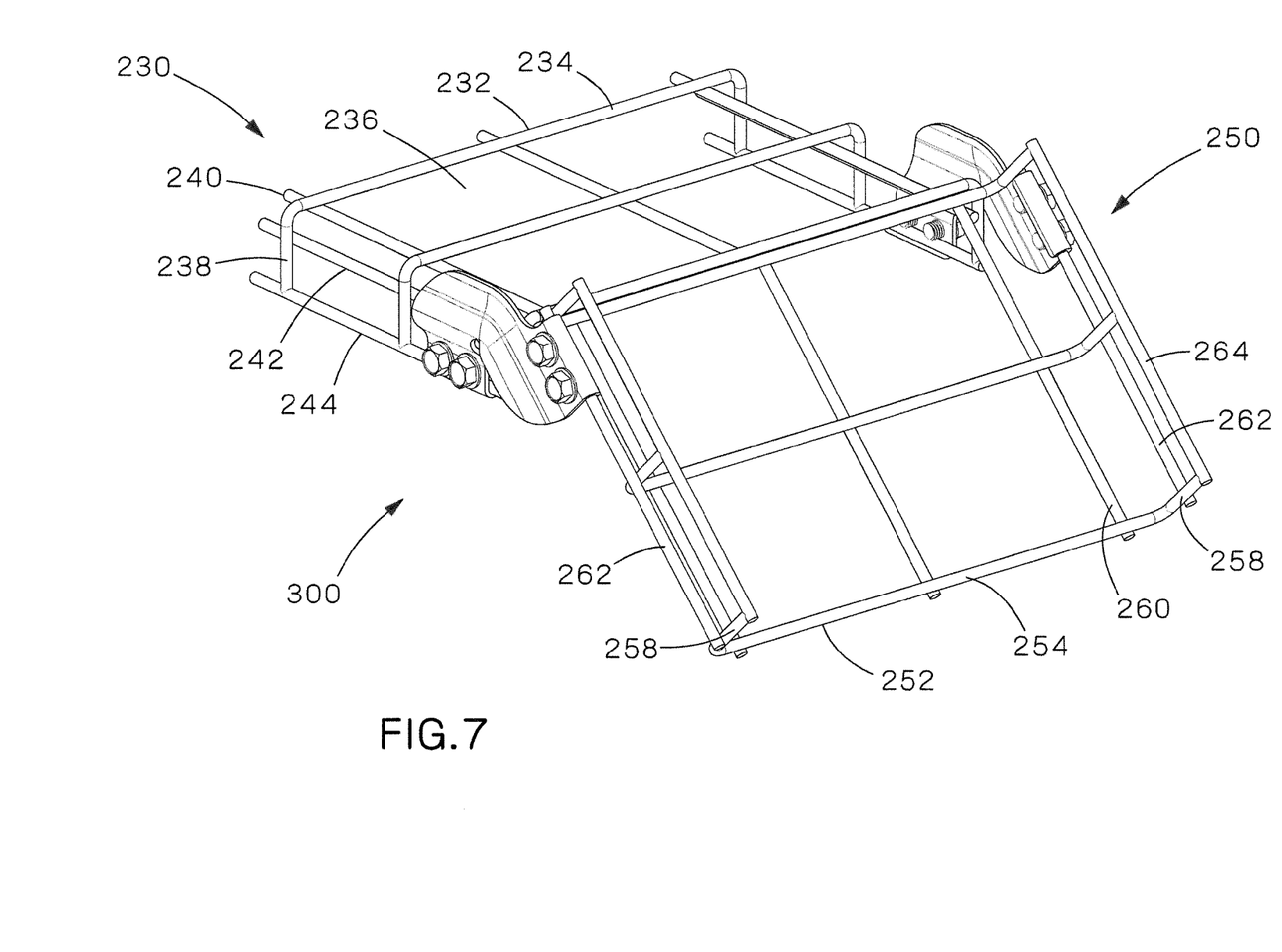
FIG. 7 is a perspective view of an alternative transition splice installed on each side of a cable routing system.
Figure 8:
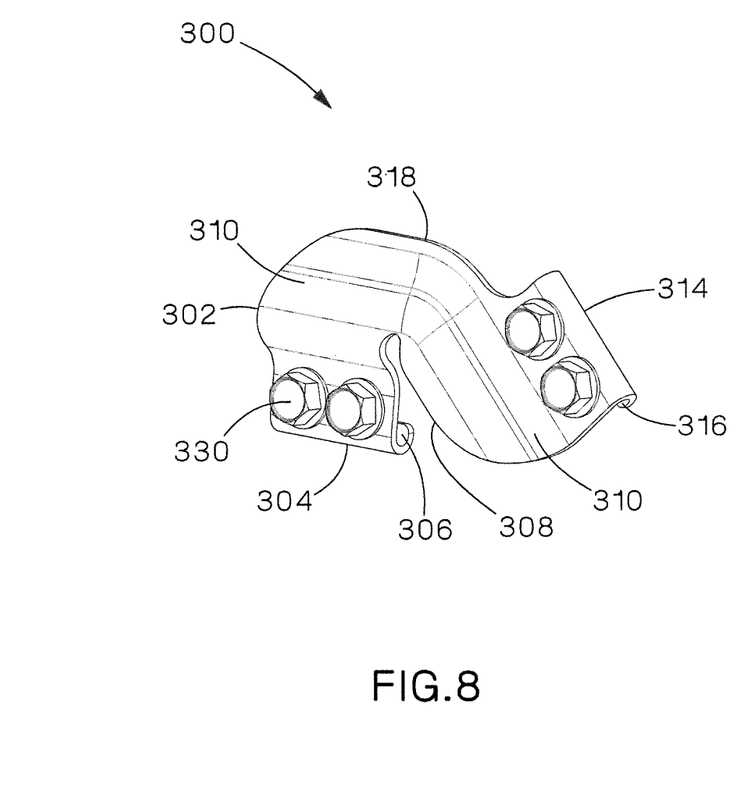
FIG. 8 is a front perspective view of the transition splice of FIG. 7.
Figure 9:
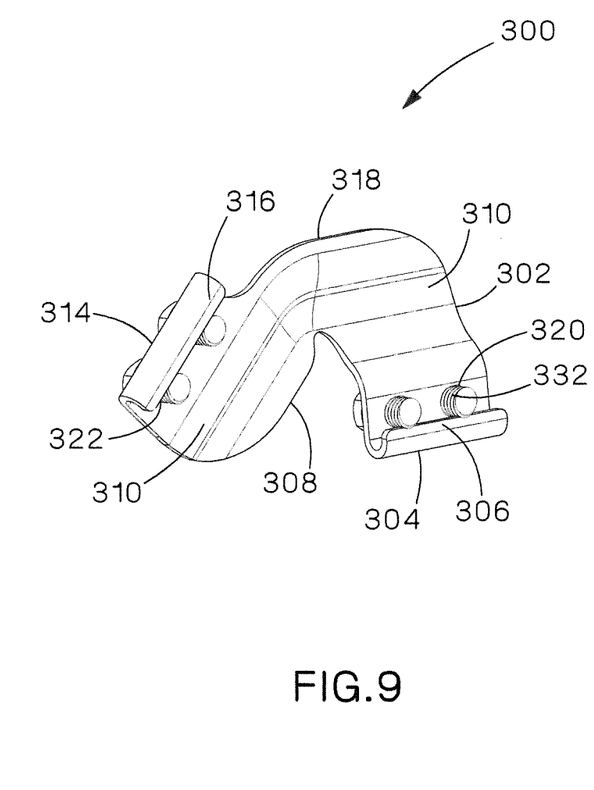
FIG. 9 is a rear perspective view of the transition splice of FIG. 7.

FIGS. 7-9 illustrate an alternative transition splice 300 of the present invention joining a cable tray 230 and an angled cable basket 250. The cable basket is positioned at approximately a 45 degree angle with respect to the cable tray. As discussed above with respect to the transition splice 100, the alternative transition splice 300 joins the cable tray 230 and the cable basket 250 to create a single cable routing system.

The cable tray 230 includes a plurality of transverse wires 232 and a plurality of longitudinal wires 240. The transverse wires 232 include a top portion 234 and downwardly extending side walls 238. The top portion 234 forms a generally flat top 236 for supporting cables routed thereon. Longitudinal wires 240 are positioned underneath the top portion 234 of the transverse wires 232. A side longitudinal wire 242 is positioned adjacent to the inner side of each side wall 238 and a bottom longitudinal wire 244 is positioned at the bottom of each side wall 238. The cable basket 250 includes a plurality of transverse wires 252 and a plurality of longitudinal wires 260. The transverse wires 252 include a bottom portion 254 and upwardly extending side walls 258. Longitudinal wires 260 are positioned underneath the bottom portion 254 of the transverse wires 252. A side longitudinal wire 262 is positioned adjacent the outer side of each side wall 258 and a top longitudinal wire 264 is positioned at the top of each side wall 258.

As illustrated in FIGS. 8 and 9, the transition splice 300 includes a body 302 with a bottom portion 304, a bottom edge 308, a curved center portion 310, a top portion 314, and a top edge 318. An upwardly extending hook 306 extends from the bottom portion 304 of the body 302 and a downwardly extending hook 316 extends from the top portion 314 of the body 302. The bottom portion 304 and the top portion 314 also each include holes 320, 322, respectively, for receiving bolts 330 to secure the transition splice 300 to the cable tray 230 and the cable basket 250.

The transition splice 300 is installed on the cable tray 230 and the cable basket 250 with the bonding bolts 330 (see FIG. 7). The hook 306 at the bottom portion 304 of the transition splice 300 is positioned around the bottom longitudinal wire 244 of the cable tray 230 and the hook 316 at the top portion 314 of the transition splice 300 is positioned around the side longitudinal wire 262 of the cable basket 250. Once the transition splice 300 is installed, the bolts 330 are tightened. As the bolts 330 are tightened, the transition splice 300 compresses the longitudinal wires 244, 262 against the hooks 306, 316, respectively. A force is applied to the interior surface of the longitudinal wires 244, 262 piercing the coating of the wires thereby creating a bond between the cable tray 230 and the cable basket 250.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A cable routing system comprising:
    at least one cable tray having a plurality of longitudinal wires and a plurality of transverse wires, wherein the transverse wires of the cable tray have downwardly extending sidewalls;
    at least one cable basket positioned adjacent the at least one cable tray, wherein the at least one cable basket having a plurality of longitudinal wires and a plurality of transverse wires, wherein the transverse wires of the cable basket have upwardly extending sidewalls, wherein a bottom longitudinal wire of the cable tray extends along a first axis and a side longitudinal wire of the cable basket extends along a second axis, wherein the first axis is parallel to the second axis; and
    a transition splice joining an end of the at least one cable tray to an end of the at least one cable basket for creating a pathway to route cables thereon, wherein the transition splice having a body with a center portion, a top portion with a downwardly extending hook, and a bottom portion with an upwardly extending hook.

2. The cable routing system of claim 1, wherein the top portion and the bottom portion having holes for receiving fasteners to secure the transition splice.

3. The cable routing system of claim 1, wherein the downwardly facing hook is parallel to the upwardly facing hook.

4. The cable routing system of claim 1, wherein the upwardly extending hook of the transition splice engages the bottom longitudinal wire of the cable tray extending along the first axis and the downwardly extending hook of the transition splice engages the side longitudinal wire of the cable basket extending along the second axis.

5. The cable routing system of claim 1, wherein the transition splice further comprising a bottom edge and a top edge.

6. The cable routing system of claim 4, wherein the bottom edge is a curved edge joining the bottom portion to the center portion; and wherein the top edge is a curved edge joining the top portion to the center portion.

7. The cable routing system of claim 1, wherein the center portion is curved.

8. A cable routing system comprising:
    at least one cable tray having a plurality of longitudinal wires and a plurality of transverse wires, wherein the transverse wires of the cable tray have downwardly extending sidewalls;
    at least one cable basket positioned adjacent the at least one cable tray, wherein the at least one cable basket having a plurality of longitudinal wires and a plurality of transverse wires, wherein the transverse wires of the cable basket have upwardly extending sidewalls; and
    a transition splice joining an end of the at least one cable tray to an end of the at least one cable basket for creating a pathway to route cables thereon, wherein the transition splice having a body with a center portion, a top portion with a downwardly extending hook, a bottom portion with an upwardly extending hook, and wherein the center portion is curved.

9. A cable routing system comprising:
- at least one cable tray having a plurality of longitudinal wires and a plurality of transverse wires, wherein the transverse wires of the cable tray have downwardly extending sidewalls;
- at least one cable basket positioned adjacent the at least one cable tray, wherein the at least one cable basket having a plurality of longitudinal wires and a plurality of transverse wires, wherein the transverse wires of the cable basket have upwardly extending sidewalls;
- a transition splice joining an end of the at least one cable tray to an end of the at least one cable basket for creating a pathway to route cables thereon, wherein the transition splice having a body with a center portion, a top portion with a downwardly extending hook, and a bottom portion with an upwardly extending hook; and
- wherein a bottom longitudinal wire of the cable tray extends along a first axis and a side longitudinal wire of the cable basket extends along a second axis, wherein the first axis intersects the second axis at an angle.

10. The cable routing system of claim 9, wherein the upwardly extending hook of the transition splice engages the bottom longitudinal wire of the cable tray extending along the first axis and the downwardly extending hook of the transition splice engages the side longitudinal wire of the cable basket extending along the second axis.

\* \* \* \* \*